United States Patent [19]

Frischmann

[11] Patent Number: 5,255,958
[45] Date of Patent: Oct. 26, 1993

[54] BARRIER DEVICE FOR CHILDREN

[76] Inventor: Thomas G. Frischmann, 6793 Bauer Rd., Arena, Wis. 53503

[21] Appl. No.: 855,424

[22] Filed: Mar. 23, 1992

[51] Int. Cl.$^5$ .............................................. B60N 2/26
[52] U.S. Cl. ...................................... 297/464; 5/513; 297/232; 297/250.1
[58] Field of Search ........................... 428/120; 5/513; 297/232, 250, 264, 485

[56] References Cited

U.S. PATENT DOCUMENTS

| | | | |
|---|---|---|---|
| 3,148,387 | 9/1964 | Sarnie, Jr. et al. | 5/513 X |
| 3,178,490 | 4/1965 | Petrino et al. | 428/318.8 X |
| 3,911,182 | 10/1975 | Lieberman | 428/319.1 X |
| 4,215,446 | 8/1980 | Mahoney | 428/100 X |
| 5,123,707 | 6/1992 | Wurzell | 297/464 |

Primary Examiner—Henry F. Epstein
Attorney, Agent, or Firm—Ross & Stevens

[57] ABSTRACT

A struggling barrier for children includes a semirigid wall for blocking struggling movements which is attached to a flexible sheet for receiving sitting body weight of children. The method of sitting on the flexible sheet transfers body weight force to the attached wall thereby causing the flexible and movable device to become a semirigid and difficult to move barrier device.

7 Claims, 1 Drawing Sheet

BARRIER DEVICE FOR CHILDREN

BACKGROUND OF THE INVENTION

This invention relates to a seating aid for children, and particularly to a struggling barrier which blocks the struggling movements of children seated near one another.

Family car travel is commonly known as a high stress activity because children instinctively struggle with one another when sitting in close proximity on a seat. They struggle over possessions, territory, touching, words, food and looks. This is more pronounced in early childhood when social skills of cooperation and sharing are still to be developed. Conflicts often develop and escalate to very high levels because parents are unable to carry out normal supervision and discipline of children seated in the backseat while they are in the front seat driving.

Previously, parents have employed a variety of methods to reduce conflict between children. They have provided entertainment and diversion, stayed home, left the kids home, put one child in front seat and one in back, or used raised voices, threats and force. They have also separated children with a variety of objects such as pillows, boards and boxes. All of these methods have only a temporary effect on reducing conflict and each has major disadvantages and limitations. Providing entertainment requires constant effort. Staying home or changing seats is inconvenient. Raised voices and force cause bad feelings and ruined outings. Objects for separation are sometimes hard and unsecured and therefore can be removed and tossed around causing an unsafe environment.

SUMMARY OF THE INVENTION

A flexible barrier device is provided for emplacement adjacent to and under seated children. The barrier device includes a flexible sheet attached at right angles to the bottom surface of a semirigid upright wall. The flexible barrier device is made semirigid when children or other individuals sit on the attached sheet thereby temporarily securing the barrier device and impeding the easy movement of the device.

In a preferred embodiment of the present invention, the upright wall is essentially rectangular in shape, having a sufficient size to impede or block the struggling movements of children and having sufficient size at its base to be self supporting in a vertical position. The flexible sheet is preferably rectangular with essentially flat anterior and posterior surfaces and has a sufficient length to receive at least one child seated on either side of the upright barrier wall.

It is therefore a principal object of the present invention to provide an improved seating aid for children.

It is another object of the present invention to provide an improved seating aid for blocking the struggling movements of children.

Yet another object of the present invention is to provide an improved barrier device for emplacement on a seating surface whereby a child's struggling movements may be blocked by the device.

A further object of the present invention is to provide an improved seating aid for children against which children may struggle without easily moving the device.

A still further object of the present invention is to provide an improved seating aid for children comprising an upright barrier wall which becomes semi-rigid when an individual is seated on either side of the upright barrier wall.

DESCRIPTION OF THE DRAWINGS

While the invention is set forth with particularity in the appended claims, other objects, features, the organization and method of operation of the invention will become more apparent, and the invention will best be understood by referring to the following detailed description in conjunction with the accompanying drawings in which:

DESCRIPTION OF THE PREFERRED EMBODIMENT

Figure 1:
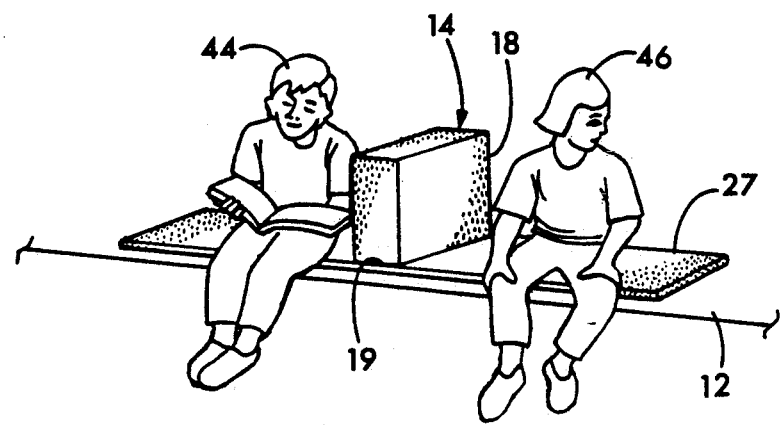
FIG. 1 is a perspective view of children sitting on a children's struggling barrier according to the instant invention.
Figure 4:
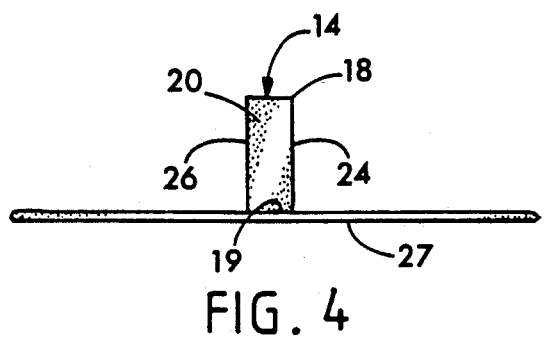
FIGS. 2, 3 and 4 are, respectively, top elevation, side elevation and front elevation views of the childrens struggling barrier of FIG. 1.
Figure 3:
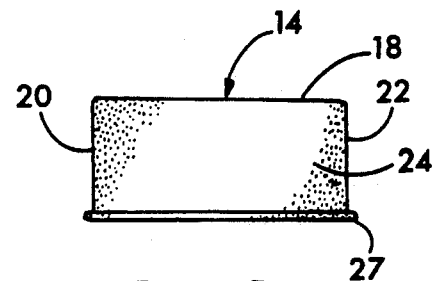

Referring now to the various views of the drawings for a more detailed description of the components, materials, construction, function, operation and other features of the instant invention, FIG. 1 illustrates the struggling barrier 14 of the present invention, comprising an upright wall 18 attached to a flexibel sheet 27 as illustrated. Two children 44, 46 are illustrated sitting on the sheet 27 attached to the wall 18, which is placed adjacent to and under children on a seating surface 12 such as a car seat on which children sit.

Figure 2:
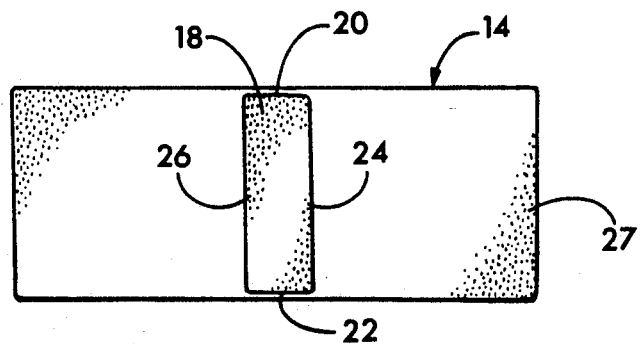

Referring to FIG. 2, the struggling barrier 14 comprises an upright wall 18 of semirigid material which suitably may be made of polyurethane foam or plastic. The wall 18 has substantially vertically front and rear sides 20, 22, respectively, and substantially vertical sides 24, 26. The wall 18 is of sufficient size to block the struggling movements of children and has sufficient size at its base 19 to be self supporting in a vertical position.

The flexible sheet 27 which suitably may be cloth, vinyl or foam is attached at right angles to the undersurface of the wall 18 at its base 19 and is of a size suitable for receiving the body weight of sitting children therein, when the struggling barrier is placed on a seating surface 12.

Although the wall 18 and sheet 27 are illustrated in FIG. 2 in the shape of rectangles, it is understood that the wall 18 may be any shape or material which suitably provides a barrier. The sheet 27 may be of any shape or material which is suitable for transferring the body weight force of sitting children to the attached wall 18. The wall 18 and sheet 27 thus form the body of a struggling barrier device 14 which will block the struggling movements of children. The heads, arms, legs children touch the anterior surface of the wall 18 rather than disturbing a seating partner.

Referring to FIGS. 1, 2, 3 and 4, children 44, 46 are seated on the sheet 27, to give weight force and rigidity to the attached wall 18 and thereby impede sliding and removal of the barrier device 14 with respect to the surface 12 when children struggle against the device. While two children 44, 46 are shown, it is evident that a single child or multiple children may provide weight force to the device.

The struggling barrier of the present invention can be used on a seat to block struggling movements and thereby help to maintain positive feelings between family members. Children enjoy the protection from sibling infringements on their personal space that the struggling barrier provides. Consequently they will remain in their own seating area and not creep, push or struggle in their partner's seating area.

While the principles of the invention have now been made clear in the foregoing illustrative embodiment, there will be immediately obvious to those skilled in the art many modifications of structure, arrangement, proportions, the elements, material and components used in the practice of the invention, and otherwise, which are particularly adapted for specific environments and operating requirements without departing from those principles. The appended claims are, therefore, intended to cover and embrace any such modifications, within the limits only of the true spirit and scope of the invention.

I claim:

1. A barrier device for separating children comprising:
   a. a sheet of flexible material of sufficient size to accommodate at least two seated children, the sheet having a substantially flat anterior surface and a substantially flat posterior surface; and
   b. an upright wall of semirigid material, the upright wall having a sufficient size to block the struggling movements of children, the upright wall having an upper surface, a base surface of sufficient size to support the upright wall in a substantially vertical position, substantially vertical side surfaces and substantially vertical anterior and posterior upright surfaces, wherein the upright wall is joined to the sheet at the base surface, such that the upright wall is substantially self-supporting in a vertical position to separate the children.

2. The barrier device of claim 1 wherein the sheet is substantially rectangular in shape.

3. The barrier device of claim 1 wherein the upright wall is substantially rectangular in shape.

4. The barrier device of claim 1 wherein the upright wall is positioned in the middle of the sheet to provide substantially equal portions of the sheet on either side of the upright wall, each portion providing a seating space for at least one child.

5. The barrier device of claim 1 further comprising means for joining the upright wall to the sheet of flexible material such that the upright wall is joined at right angles to the anterior surface of the sheet.

6. A barrier device for separating children comprising:
   a. a substantially rectangular sheet of flexible material of sufficient size to accommodate at least two seated children, the sheet having a substantially flat anterior surface and a substantially flat posterior surface;
   b. a substantially upright wall of semirigid material positioned in the middle of the sheet to provide substantially equal portions of the sheet on either side of the upright wall, each portion providing a seating space for at least one child, the upright wall having a sufficient size to block the struggling movements of children, the upright wall having an upper surface, a base surface of sufficient size to support the upright wall in a substantially vertical position, substantially vertical side surfaces and substantially vertical anterior and posterior upright surfaces, wherein the upright wall is joined to the sheet at the base surface, such that the upright wall is substantially self-supporting in a vertical position to separate the children; and
   c. means for joining the upright wall to the sheet of flexible material such that the upright wall is joined at right angles to the anterior surface of the sheet whereby children sitting on the sheet will transfer body weight force through the sheet and the joining means to the upright wall to impede movement of the upright wall.

7. A barrier device for separating children in an automobile, comprising:
   (a) a sheet of flexible material of sufficient size to accommodate at least one child on each side of the device, the sheet having a substantially flat anterior surface and a substantially flat posterior surface; and
   (b) an upright wall of semirigid material, the upright wall having a sufficient size to block the struggling movements of children, the upright wall having an upper surface, a base surface of sufficient size to support the upright wall in a substantially vertical position, substantially vertical side surfaces and substantially vertical anterior and posterior upright surfaces, wherein the upright wall is joined to the sheet at the base surface, such that the upright wall is substantially self-supporting in a vertical position.

* * * * *